Nov. 6, 1951 C. J. GREEN 2,573,764
VARIABLE PITCH PROPELLER
Filed June 7, 1947
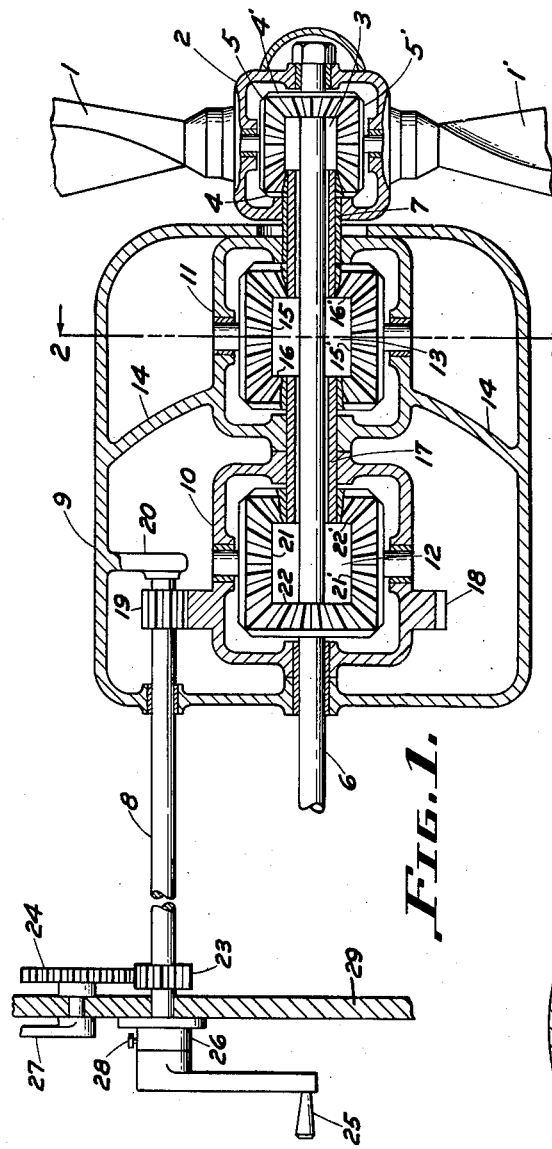
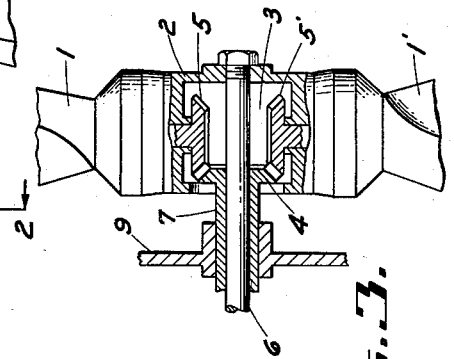
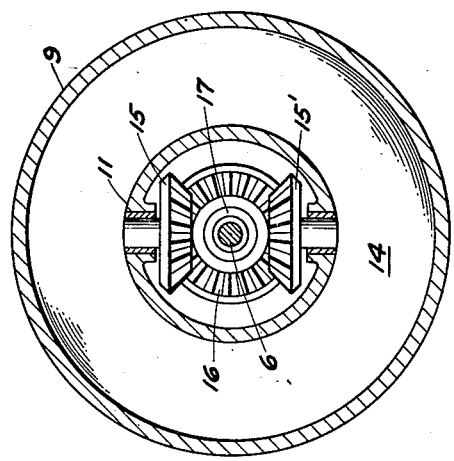
INVENTOR.
Carl J. Green Patented Nov. 6, 1951

2,573,764

UNITED STATES PATENT OFFICE 2,573,764

VARIABLE PITCH PROPELLER

Carl J. Green, Oak Ridge, Tenn.

Application June 7, 1947, Serial No. 753,287

3 Claims. (Cl. 170—160.48)

This invention relates generally to mechanism and apparatus for varying the pitch of propellers for aircraft and the like, and is more particularly concerned with improvements in that class of such apparatus wherein the pitch adjustment of the propeller blades is obtained solely by rotational movement, that is, by means of shafting and gearing and the like.

It may be stated generally that all variable pitch propeller mechanism falling in the class with which this invention is concerned are characterized by the presence of a drive shaft rigidly connected to a source of power, such as an aircraft engine, an adjusting shaft, differential means connecting both of these shafts to the propeller to simultaneously drive the same and control the pitch of the blades thereof, and finally adjustable gearing interconnecting the drive shaft and the adjusting shaft, whereby this adjustable gearing provides the desired control over the pitch of the propeller blades. Although many features of the complete design of the pitch control apparatus of the present invention contribute to the superiority of my device over prior art devices, the most important aspects of my invention pertain to improvements which I have made in the above mentioned adjustable gearing interconnecting the drive shaft and the adjusting shaft.

Although many variable pitch propeller mechanisms of this type operate more or less satisfactorily, they all suffer from several common disadvantages, previously thought to be inherent in this kind of apparatus. For instance, present devices are generally cumbersome and complicated. Also they are usually difficult to mount and support. Perhaps most important, they are highly unsymmetrical, and because of this, they lack dynamic balance and are subject to serious vibration. This latter defect results in many secondary and incidental disadvantages among which are increased wear and tear on bearings, gearing, and other movable parts, the requirement for stronger and heavier mounting arrangements, and the many ill effects which result from the induced vibration in adjoining portions of the aircraft.

I have conceived that substantially all of these disadvantages of prior art devices could be overcome by subordinating other seemingly more important design considerations to those of obtaining complete symmetry and dynamic balance in the final apparatus and reducing the rotational moment of inertia to an absolute minimum. This has led to almost complete reliance on bevel gearing throughout the apparatus, and this, in turn, has resulted and many other cumulative advantages which will be evident as the description proceeds. In particular, the use of bevel gearing has permitted the attainment of variable pitch propeller mechanism wherein there are no normally moving parts which rotate about an axis parallel to, and offset from, the main drive shaft. In this respect my invention is in marked contrast to prior art apparatus, and from this feature many of the advantages of my invention arise.

Accordingly, the general object of my invention is to provide improvements in that type of variable pitch propeller apparatus wherein the adjustment of the propeller blades is obtained solely by rotational movement.

A more specific object of my invention is to provide an improved form of adjustable gearing interconnecting the drive shaft and the adjusting shaft of a variable pitch propeller mechanism.

Another object of my invention is the provision of variable pitch propeller apparatus which is simple, rugged, and compact.

Still another object of my invention is to provide variable pitch propeller mechanism which is characterized by a maximum degree of symmetry and dynamic balance and is subject to reduced vibrational tendencies.

A further object of my invention is the provision of a variable pitch propeller mechanism wherein all normally rotating elements have an axis of spin either coincident with that of the main drive shaft or perpendicular thereto.

Other objects and advantages of my invention will become apparent from the following description, taken in connection with the accompanying drawings, wherein:

Fig. 1 is an elevation view in section of a preferred embodiment of a variable pitch propeller mechanism constructed according to the principles of the present invention;

Fig. 2 is a section taken along the lines 2—2 of Fig. 1; and

Fig. 3 is a modified form of a portion of the apparatus of Fig. 1.

In all the above figures, identical reference numerals are employed to designate corresponding parts.

Referring now to Fig. 1, on the right hand side thereof there is shown a propeller having propeller blades 1, 1' and a hub 2 in the form of a yoke or housing for a bevel type differential gearing system, indicated generally at 3. The differential gearing system 3 is conventional and comprises a pair of horizontally spaced bevel gears 4, 4', and, at right angles thereto, a pair of vertically spaced bevel gears 5, 5'. Propeller blades 1, 1' each have a reduced root portion which extends through flanged bearings in hub 2 and are keyed or otherwise rigidly connected to bevel gears 5, 5', respectively. A main drive shaft 6, which will be understood to be connected to the aircraft engine, is rigidly connected to bevel gear 4' and is rotatably supported at its rightmost extremity in a suitable bearing in hub 2. Rigidly connected to bevel gear 4 is a hollow adjusting shaft 7 surrounding and coaxial with respect to drive shaft 6. Adjusting shaft 7 enters hub 2 through a bearing at the extreme left of hub 2.

Differential gearing system 3 operates in the conventional manner with the rotation of drive shaft 6 constituting one input, the rotation of adjusting shaft 7 constituting another input, the rotation of hub 2 (and the propeller, as a whole) constituting one output, and the rotation of the individual propeller blades (pitch adjustment) constituting another output. As will later be described in detail, adjusting shaft 7 is driven from the main drive shaft 6 through an adjustable gear train such that adjusting shaft 7 normally rotates in the same direction and at the same speed as drive shaft 6. It will be apparent that under such conditions drive shaft 6 and adjusting shaft 7 will cooperate to drive the propeller, as a whole, at a corresponding speed through the interaction of bevel gears 4, 4' and 5, 5', the latter pair of gears remaining stationary with respect to rotation about an axis along the propeller blades.

By means of the aforementioned adjustable gear train, however, it is possible to manually effect an additional arbitrary rotation of adjusting shaft 7, that is, a rotation of adjusting shaft 7 with respect to drive shaft 6, by an amount corresponding to the angular displacement of a manually controlled control shaft 8. When the operator angularly displaces shaft 8, and thus effects a corresponding rotation of adjusting shaft 7 with respect to drive shaft 6, it will be evident that differential gearing system 3 will operate in a well-known manner to effect equal and opposite angular displacements of bevel gears 5, 5' and propeller blades 1, 1', respectively. In this manner, therefore, the pitch of the propeller blades is manually controlled by rotation of control shaft 8.

The above-mentioned adjustable gear train, which drives adjusting shaft 7 from drive shaft 6, is contained within a main housing 9, which housing includes in its interior two sub-housings 10 and 11, both of which house a differential gearing system designated generally at 12 and 13, respectively. Sub-housing 11 is fixed with respect to the main housing 9 by being attached thereto on the right and by being additionally supported on the left by supporting member 14. Differential gearing system 13 comprises vertically spaced bevel gears 15, 15' pivotally mounted in sub-housing 11 for rotation about a transverse axis, and horizontally spaced bevel gears 16, 16' pivotally supported within housing 11 for rotation about a horizontal axis. Bevel gear 16' is rigidly connected to the previously mentioned adjusting shaft 7, whereas bevel gear 16 is rigidly connected to an intermediate hollow shaft 17 also coaxial with respect to drive shaft 8. Intermediate shaft 17 is rotatively supported by a flanged bearing at the left of sub-housing 11.

Sub-housing 10, although normally stationary, is rotatably supported by means of intermediate shaft 17 on the right and drive shaft 6 on the left, these shafts extending through suitable bearings in sub-housing 10. Drive shaft 6, in turn, is rotatively supported by means of a flanged bearing at the extreme left of the main housing 9. A ring gear 18 surrounds, and is integrally connected to, sub-housing 10, and this ring gear engages a small spur gear 19 keyed to control shaft 8. Control shaft 8 enters main housing 9 by way of a suitable flanged bearing, and is journalled at its inner extremity by means of a bearing contained in a supporting member 20 which projects downwardly from main housing 9.

Differential gearing 12 comprises vertically spaced bevel gears 21, 21' which are pivotally mounted within sub-housing 10 for rotation about a transverse axis, and horizontally spaced bevel gears 22, 22' which are rotatable about a horizontal axis. Bevel gear 22 is rigidly connected to drive shaft 6, whereas bevel gear 22' is rigidly connected to intermediate shaft 17.

Before considering the operation of the adjustable gearing contained within housing 9 in detail, it may first be helpful to outline generally the functions of the various components of the system. Differential gearing 12 operates in the usual manner of a differential with the angular displacement of drive shaft 6 constituting one input, the angular displacement of drive shaft 8 constituting the other input, and the angular displacement of intermediate shaft 17 constituting the output, which output, of course, corresponds to the algebraic sum of the two inputs. Differential gearing 13 operates merely as a reversing gearing since one of the normal inputs is held fast. Thus, the angular displacement of adjusting shaft 7, which constitutes the output of differential gearing 13, is at all times exactly equal to, but in the opposite direction from, the angular displacement of intermediate shaft 17, which constitutes the sole input to differential gearing 13.

Considering now the detailed operation of the apparatus, it will first be assumed that adjusting shaft 8 is held stationary. It follows, then, under this condition, that housing 10 is also held stationary, and differential gearing 12 also operates merely as a reversing gear. Thus, drive shaft 6 operates through bevel gears 22, 21, 21', and 22' to drive intermediate shaft 17 at the same speed as shaft 6, but in an opposite direction. Similarly, intermediate shaft 17 operates through bevel gearing 16, 15, 15', and 16' to drive adjusting shaft 7 at a speed equal and opposite to that of intermediate shaft 17. Accordingly, adjusting shaft 7 and drive shaft 6 will rotate in the same direction and at equal speeds, that is, they will be stationary with respect to each other, and, as previously pointed out, they will cooperate to drive the propeller through differential gearing 3 at a corresponding speed.

Although the effect of rotation of control shaft 8 will be the same regardless of the speed of rotation of drive shaft 6, it may be somewhat easier to understand this effect under the condition that drive shaft 6 is stationary. This condition therefore is temporarily assumed for purposes of explanation. Any angular displacement of control shaft 8 will be immediately followed by a corresponding but smaller displacement of sub-housing 10 through the interaction of spur gear 19 and ring gear 18. As sub-housing 10 rotates, it necessarily carries with it bevel gears 21, 21', which gears are also caused to rotate by reason of their engagement with bevel gear 22 which is attached to the stationary drive shaft 6. Rotation of bevel gears 21, 21' results in a corresponding rotation of bevel gear 22' and intermediate shaft 17. This, in turn, results in an equal but opposite rotation of adjusting shaft 7 through the reversing effect of differential gearing 13. Thus, it is seen that angular displacement of control shaft 8 effects a corresponding displacement of adjusting shaft 7 with respect to drive shaft 6. This will obviously be true irrespective of whether drive shaft 6 is stationary or rotating. As previously pointed out, any rotation of adjusting shaft 7 with respect to drive shaft 6 results in a variation of the pitch of the propeller blades. It will be apparent, therefore, that any desired propeller blade pitch can be obtained by suitable adjustment of the angular displacement of control shaft 8.

Referring again to Fig. 1, there is shown at the extreme left a convenient manner for manually controlling the angular displacement of control shaft 8, locking said shaft in position, and indicating the instantaneous pitch of the propeller blades. As shown, there is mounted on control shaft 8 a gear 23, which engages a gear 24, which, in turn, actuates a propeller pitch position indicator 27 located on the opposite side of the instrument panel 29. Position indicator 27 has associated with it the usual dial (not shown) calibrated in terms of degrees propeller pitch. Control shaft 8 extends through the instrument panel 29, and is journalled in a bearing 26, which bearing has associated therewith a set screw 28 for locking control shaft 8 in position after the proper propeller pitch has been attained by manual movement of a crank 25.

Instead of employing set screw 28 to lock crank 25 in place, a worm drive could be incorporated in place of, or as a part of the gear train interconnecting crank 25 and sub-housing 10. In such case, the worm would occur prior to the worm wheel in the drive from crank 25 to sub-housing 10. As is well known, such a worm drive would operate in a unidirectional manner, permitting rotation of sub-housing 10 from crank 25 but preventing reverse actuation of the crank from the sub-housing. Also, it is contemplated that a hydraulic or electric power system could be employed to rotate sub-housing 10, if desired, instead of the direct manual drive shown.

There are several features of the above-described pitch control apparatus which are especially noteworthy. For instance, it will be noted that a large number of the parts are standard and identical. Three standard differential gearing systems may be employed, each having four identical bevel gears. As is well known, bevel gearing is inherently rugged and well adapted to high speeds. Furthermore, the whole apparatus is essentially symmetrical with respect to, and mounted close in around, the main drive shaft, with the result that the apparatus is well balanced dynamically and has little tendency to vibrate. In this connection, it will be noted that the axes of spin of all normally rotating parts are either coincident with, or perpendicular to, the main drive shaft.

Referring now to Fig. 3, wherein there is illustrated a somewhat modified form of gearing arrangement for interconnecting drive shaft 6 and adjusting shaft 7 with the propeller blades 1, 1' and hub 2, it will be noted that this arrangement differs from the corresponding portion of Fig. 1 in that bevel gear 4' is omitted and drive shaft 6 is rigidly attached to hub 2 rather than being journalled therein. In this case, drive shaft 6 drives the propeller directly and it carries the whole load thereof, whereas in the apparatus of Fig. 1, the load is shared equally by drive shaft 6 and adjusting shaft 7. In the apparatus of Fig. 3, although adjusting shaft 7 still has a normal speed of rotation identical to that of drive shaft 6, it contributes no part of the driving torque for the propeller.

With respect to the effect of relative rotation of drive shaft 6 and adjusting shaft 7, the operation is identical to that described with respect to Fig. 1. Such relative rotation will result in relative rotation about a horizontal axis of bevel gear 4 with respect to bevel gears 5, 5', which, in turn, necessarily results in equal and opposite rotations of bevel gears 5, 5', respectively, about an axis lengthwise of the propeller blades. Since bevel gears 5, 5' are rigidly connected to propeller blades 1, 1', respectively, a variation in the pitch of the propeller blades is thus obtained.

Since many changes could be made in the above construction and many apparently widely different embodiments of this invention could be made without departing from the scope thereof, it is intended that all matter contained in the above description, or shown in the accompanying drawings, shall be interpreted as illustrative and not in a limiting sense. In particular, it is desired to call attention to the fact that differential gearing 12, which operates as a true differential, and differential gearing 13, which operates simply as reversing gearing, may be interchanged as regards the order of their occurrence in the adjustable gear train interconnecting drive shaft 6 and adjusting shaft 7, without affecting, in any manner, the operation of the invention or sacrificing any of its advantages.

What is claimed is:

1. Variable pitch propeller mechanism comprising a drive shaft connected to be driven from the engine, an adjusting shaft coaxial with said drive shaft and rotatable with respect thereto, a propeller having a hub and blades pivotally mounted on said hub for rotation about a transverse axis, said hub having axially spaced bearings on opposite sides thereof, one of said bearings journalling said adjusting shaft and the other of said bearings journalling said drive shaft, a pair of axially spaced bevel gears disposed within said hub, one of said bevel gears being rigidly attached to said adjusting shaft and having a central aperture for accommodating said drive shaft, and the other of said bevel gears being rigidly attached to said drive shaft, a pair of transversely spaced bevel gears also disposed within said hub and engaging said axially spaced bevel gears, one of said transversely spaced bevel gears being rigidly attached to one propeller blade and the other of said transversely spaced bevel gears being rigidly attached to the other of said propeller blades, and manually controllable adjusting gearing external to said hub adjustably interconnecting said drive shaft and said adjusting shaft.

2. Apparatus, as claimed in claim 1, wherein said last-mentioned means comprises two bevel type differential gearing systems each having two input elements and an output element, means connecting said drive shaft to one input element of the first of said systems, means connecting the output element of said first system to one input element of the second of said systems, means connecting the output element of said second system to said adjusting shaft, means maintaining the second input element of one of said systems stationary and means for manually controlling the second input element of the other of said systems.

3. Variable pitch propeller mechanism comprising a drive shaft connected to be driven from the engine, an adjusting shaft coaxial with said drive shaft and rotatable with respect thereto, a propeller having a hub and blades pivotally mounted on said hub for rotation about a transverse axis, said hub having axially spaced bearings on opposite sides thereof, one of said bearings journalling said adjusting shaft and the other of said bearings journalling said drive shaft, a pair of axially spaced bevel gears disposed within said hub, one of said bevel gears being rigidly attached to said adjusting shaft and having a central aperture for accommodating said drive shaft, and the other of said bevel gears being rigidly attached to said drive shaft, a pair of transversely spaced bevel gears also disposed within said hub and engaging said axially spaced bevel gears, one of said transversely spaced bevel gears being rigidly attached to one propeller blade and the other of said transversely spaced bevel gears being rigidly attached to the other of said propeller blades, a main casing axially adjacent said propeller, said casing having at the engine side thereof a central journal accommodating an entering portion of said drive shaft and at the propeller side thereof a central journal simultaneously accommodating said adjusting shaft and an emergent portion of said drive shaft, two axially spaced bevel type differential gear assemblies mounted within said casing, each of said assemblies consisting of a housing containing a pair of spaced bevel gears coaxial with respect to said drive shaft and another pair of spaced bevel gears engaging said first pair and journalled in said housing for rotation about a transverse axis, a rigid connection between said drive shaft and the first coaxial gear of the first of said assemblies, a rigid connection between the second coaxial gear of said first assembly and the first coaxial gear of the second of said assemblies, a rigid connection between the second coaxial gear of said second assembly and said adjusting shaft, means for rigidly supporting the housing of said second assembly from said casing, means for pivotally supporting the housing of said first assembly for rotation about said drive shaft, a control shaft offset with respect to said drive shaft, a third journal in said main casing accommodating said control shaft, a ring gear integrally attached to the housing of said first assembly, a spur gear attached to said control shaft and engaging said ring gear, and manually operable means external to said main casing for rotating said control shaft.

CARL J. GREEN.

REFERENCES CITED

The following references are of record in the file of this patent:

UNITED STATES PATENTS

| Number | Name | Date |
|---|---|---|
| 1,431,382 | Duerr | Oct. 10, 1922 |
| 1,999,091 | Ebert | Apr. 23, 1935 |
| 2,224,640 | Bonawit | Dec. 10, 1940 |
| 2,239,739 | Ruths et al. | Apr. 29, 1941 |
| 2,378,938 | McCoy | June 26, 1945 |
| 2,409,050 | Ledwinka | Oct. 8, 1946 |

FOREIGN PATENTS

| Number | Country | Date |
|---|---|---|
| 22,325 | Great Britain | Nov. 1, 1905 |
| 381,648 | Great Britain | Oct. 13, 1932 |
| 726,918 | France | Mar. 15, 1932 |
| 771,686 | France | July 30, 1934 |
| 350,549 | Italy | 1937 |